United States Patent
Cohn et al.

[11] Patent Number: 5,802,963
[45] Date of Patent: Sep. 8, 1998

[54] MODULE FOR PRODUCING HOT HUMID AIR

[75] Inventors: Robert J. Cohn, Dallas; Chad Morgan, West Pittston, both of Pa.

[73] Assignee: Product Solutions Inc., Wilkes-Barre, Pa.

[21] Appl. No.: 929,121

[22] Filed: Sep. 3, 1997

Related U.S. Application Data

[63] Continuation-in-part of Ser. No. 858,117, May 19, 1997.

[51] Int. Cl.⁶ .............................. A21B 1/00; A21B 1/22; F27D 11/00; A23L 1/00
[52] U.S. Cl. .............................. 99/476; 99/330; 99/331; 99/474; 99/483; 126/21 A; 126/369; 219/401
[58] Field of Search .............................. 99/467, 331, 468, 99/330, 473–476, 516, 483; 126/21 A, 369, 348, 20, 20.1, 20.2; 219/401, 400; 110/179, 173 R; 312/236; 34/197, 151

[56] References Cited

U.S. PATENT DOCUMENTS

| | | | |
|---|---|---|---|
| 2,147,024 | 2/1939 | Frisk | 99/468 X |
| 3,943,842 | 3/1976 | Bills et al. | 99/473 |
| 3,999,475 | 12/1976 | Roderick | 99/474 |
| 4,110,916 | 9/1978 | Bemrose | 99/476 X |
| 4,165,620 | 8/1979 | Gehauf Nee Kiesel et al. | 99/476 X |
| 4,244,979 | 1/1981 | Roderick | 426/418 |
| 4,483,243 | 11/1984 | Cote | 99/468 |
| 4,674,402 | 6/1987 | Raufeisen | 219/401 X |
| 5,072,666 | 12/1991 | Hullstrung | 99/483 X |
| 5,532,456 | 7/1996 | Smith et al. | 219/400 |
| 5,558,010 | 9/1996 | Shelton | 99/468 |
| 5,595,109 | 1/1997 | Shelton | 99/476 |

*Primary Examiner*—Timothy F. Simone
*Attorney, Agent, or Firm*—Michael Ebert

[57] ABSTRACT

A module adapted to generate a stream of hot, humid air, the module operating in conjunction with a proofing chamber in which pieces of yeast dough are raised prior to baking by being subjected to this stream. One section of the module is occupied by a replenishable water reservoir from which water is fed into the water pan of a steam generator. The pan is provided with a water heater element for boiling the water to produce steam which is collected in a steam chamber above the pan. A parallel section of the module is occupied by an air duct whose air intake at the inlet end of the duct leads to an air blower blowing a stream of air through an air heater element producing a hot air stream that flows via a mixing zone toward an exhaust vent at the outlet end of the duct. Steam from the steam chamber is injected by a steam tube into the mixing zone in the duct to intermingle with the hot air stream whereby discharged from the exhaust vent is a stream of hot, humid air.

13 Claims, 4 Drawing Sheets

MODULE FOR PRODUCING HOT HUMID AIR

RELATED APPLICATION

This application is a continuation-in-part of our co-pending application Ser. No. 08/858,117 filed May 19, 1997, pending entitled "SOFT HOOD AND MODULE DOUGH PROOFING ASSEMBLY," the entire disclosure of which is incorporated herein by reference.

BACKGROUND OF INVENTION

1. Field of Invention

This invention relates generally to modules for producing hot, humid air, and more particularly to a module of this type adapted to operate in conjunction with a proofing chamber in which yeast dough pieces subjected to an atmosphere of hot, humid air are raised thereby prior to baking.

2. Status of Prior Art

Proofing refers to a process by which pieces of yeast dough shaped to form bakery products are raised or enlarged preparatory to their being baked. Thus pastries, rolls, breads and other bakery products must undergo proofing before being put in an oven to be baked. When dough intermixed with live yeast is placed in a warm moist environment, carbon dioxide is then internally generated throughout the body of the dough to create myriad gas pockets. These gas pockets enlarge or raise the dough and also alter its texture.

When the proofed dough is baked, the resultant product is lighter and more chewy than dough products which are not raised prior to baking. Thus croissants, doughnuts, pan pizzas, rolls and breads must be properly proofed before being baked. Proofing therefore is the process by which the shaped yeast dough pieces are subjected to a moist, hot-air environment to raise the pieces, and a proofing cabinet is a chamber in which proofing takes place. Such cabinets have heretofore been fabricated of rigid materials and therefore constitute "hard cabinets" as distinguished from a "soft" hood formed of flexible plastic sheeting creating a proofing chamber.

It is vital that the atmosphere in which proofing takes place within a cabinet be properly controlled to avoid underproofing or overproofing. Thus should the dough pieces receive excessive heat, they will rise too fast, thereby producing large gas pockets that cause the pieces to collapse during baking. On the other hand, insufficient heat results in dough pieces that are not fully raised, and when these pieces are baked they will have a doughy core. Excessive moisture in proofing causes the product to have a mushy surface, while insufficient moisture renders the surface of the baked product tough and rubbery.

In order therefore to properly proof a load of yeast dough pieces, all pieces in the proofing chamber must be subjected to optimal conditions of heat and moisture that are uniform throughout the chamber and give rise to uniform raising of the pieces.

Two types of proofing cabinets are now in common use. In large scale bakeries as well as in supermarkets having baking facilities, use is made of a floor-mounted proofing cabinet adapted to accommodate a multi-level baker's rack loaded with sheet pans carrying the dough pieces to be proofed. In this stationary type of proofing cabinet the loaded baker's rack is rolled into the floor mounted proofing cabinet in which the dough pieces loaded on the rack are then subjected to hot, humid air.

For smaller installations, such as in a small scale bakery, a donut shop or a pizzeria, use is made of a mobile proofing cabinet, usually about 6 feet high and 2 by 2 feet square, fabricated of sheet aluminum and provided with Lexan doors. With a mobile proofing cabinet, the dough pieces to be proofed are placed on flat pans which are received on multi-level slides in the cabinet.

But whether proofing is carried out in a stationary cabinet or in a mobile cabinet, the cost of these cabinets is relatively high and the cabinets take up space in the bakery facility that may be in short supply. Thus all bakeries are equipped with open baker's racks on casters for conveying dough products to various stations in the facility. There may therefore be little room available in the bakeries for a large proofing cabinet, particularly for a cabinet that must be installed at a fixed position.

Of prior art interest is the 1984 patent to Cote U.S. Pat. No. 4,483,243 which discloses a proofing cabinet into which is wheeled a rack loaded with bakery products to be proofed. Coupled to the cabinet by a duct is a heat generator, the heated air being circulated by a fan. The 1987 patent to Raufeisen U.S. Pat. No. 4,674,402 refers to the Cote patent, the concern of Raufeisen being with proofing frozen bakery goods which must therefore be thawed before being proofed.

Other proofing cabinet arrangements are shown in the 1939 Frisk U.S. Pat. No. 2,147,024 the 1987 Doods U.S. Pat. No. 4,635,540, and the 1991 Hullstrung U.S. Pat. No. 5,072,666. The concern of Hullstrung is with the distribution of water vapor throughout the cabinet without producing hot and cold spots. Thus a common drawback of commercially available proofing cabinets is that the hot, humid air environment within the cabinet interior is uneven, some regions being warmer and moister than others; as a consequence of which the dough pieces within this environment are not uniformly proofed.

In our above-identified patent application there is disclosed a soft hood and module assembly adapted to convert an open baker's rack loaded with pieces of yeast dough into a proofing chamber wherein the pieces are subjected to a hot humid air environment acting to raise these pieces prior to their baking. The module for generating hot humid air is placed in the base of the rack with its air inlet adjacent the front end of the rack and its outlet adjacent the rear end. The soft hood which is fabricated of flexible plastic sheeting encloses the rack to form a chamber having a feed duct parallel to the rear end of the rack which communicates with the module outlet, and a return duct parallel to the front end of the rack which communicates with the module inlet.

In operation, hot, humid air blown out of the module outlet into the feed duct is distributed thereby to pass across the dough pieces supported by the rack into the return duct from which the air flows back into the inlet of the module for recirculation in the chamber.

The module disclosed in our copending patent application which fits into the base of the baker's rack includes a shallow open water pan having a well therein in which an electric heater element is disposed to boil the water. Within the module under the pan is a motor-driven blower and an electric heater element. Air is drawn into the module through an air inlet, while hot, humid air is blown out of the module through an outlet.

The reason the air heated within the module is rendered humid is that the air blower therein creates a negative pressure at the module inlet and a positive pressure at its outlet. Since the open pan of water from which steam emanates lies between the inlet and the outlet, air blowing over the open water pan toward the negative pressure inlet entrains the steam. The resultant moist air is sucked into the inlet and is blown out of the outlet as humid hot air.

Because the water pan in the module is open to the atmosphere and steam is released therefrom, it is difficult to produce hot air having a high humidity content unless the pan has a relatively large exposed area. But since this area is dictated by the dimensions of the rack in which the module is received, the pan size is necessarily limited. And it is also difficult, using thermostatic control for this purpose, to maintain a desired humidity level.

Another practical drawback of this module is that in order to add water to the open pan when water in the pan runs low, one must open the proofing chamber to obtain access to the pan. In doing so, the interior of the proofing chamber is exposed to ambient air, thereby upsetting the prevailing temperature and humidity conditions.

SUMMARY OF INVENTION

In view of the foregoing, the main object of this invention is to provide a module for efficiently generating a stream of hot, humid air.

More particularly, an object of this invention is to provide a module of the above type which is operable in conjunction with a proofing chamber in which yeast dough pieces are subjected to a stream of hot, humid air blown out of the exhaust vent of the module, the stream flowing over the dough pieces and then into the air intake of the module whereby the stream of hot humid air is recirculated in the chamber to effect uniform proofing of the dough pieces.

Among the salient advantages of a module in accordance with the invention are the followings:

A. The temperature of the air discharged from the module and its relative humidity are readily controllable to maintain the desired atmospheric conditions in the interior of the proofing chamber to which the module is coupled.

B. The water in the module which is to be converted into steam is stored in a reservoir coupled by tubing to a water pan in an adjacent steam generator having a water heater element therein. The tubing acts as a buffer to prevent hot water in the pan of the steam generator from raising the temperature of the water in the reservoir to unsafe levels.

C. The tubing which couples the water reservoir to the water pan of the steam generator makes available only a relatively small volume of water for conversion into steam; hence the water to be heated in the pan of the steam generator is not loaded down by the cool water in the reservoir. Consequently the water in the pan of the steam generator is quickly boiled and the module has a short start-up time. On the other hand, as water in the pan of the steam generator is converted to steam, fresh water is supplied to the pan by the reservoir.

D. When water in the module reservoir runs low, it may be replenished without having to open the door of the proofing chamber to obtain access to the reservoir and disturbing the moist atmosphere therein. And it is also possible, when it becomes necessary to clean and delime the water system, to drain all of the water from the reservoir and from the pan of the steam generator without having to open the door of the proofing chamber.

E. In the module in which steam is intermingled with a stream of hot air by injecting the steam into this stream, it is possible to control the relative humidity of the resultant humid stream simply by reducing the power supplied to the water heater in the steam generator, no other adjustment being necessary.

Briefly stated, these objects are attained by a module adapted to generate a stream of hot, humid air, the module operating in conjunction with a proofing chamber in which pieces of yeast dough are raised prior to baking by being subjected to this stream. One section of the module is occupied by a replenishable water reservoir from which water is fed into the water pan of a steam generator. The pan is provided with a water heater element for boiling the water to produce steam which is collected in a steam chamber above the pan.

A parallel section of the module is occupied by an air duct whose air intake at the inlet end of the duct leads to an air blower blowing a stream of air through an air heater element producing a hot air stream that flows via a mixing zone toward an exhaust vent at the outlet end of the duct. Steam from the steam chamber is injected by a steam tube into the mixing zone in the duct to intermingle with the hot air stream whereby discharged from the exhaust vent is a stream of hot, humid air.

BRIEF DESCRIPTION OF DRAWING

For a better understanding of the invention, as well as further features thereof, reference is made to the detailed description thereof to be read in connection with the annexed drawings wherein.

DESCRIPTION OF INVENTION

The Assembly

Figure 1:
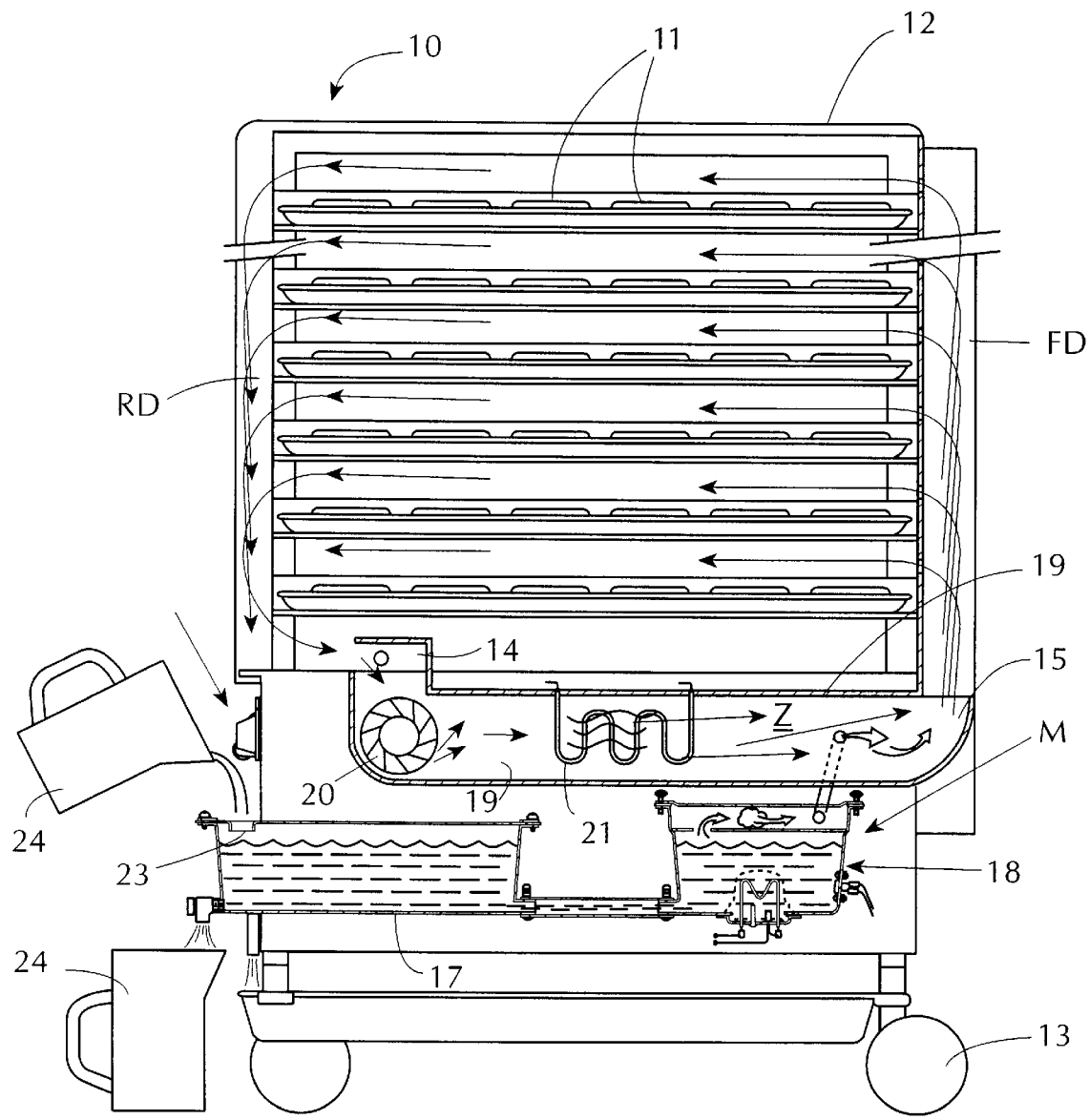
FIG. 1 schematically illustrates a module in accordance with the invention operating in conjunction with a proofing chamber in which pieces of yeast dough are subjected to an atmosphere of hot, humid air discharged from the module.
Figure 2:
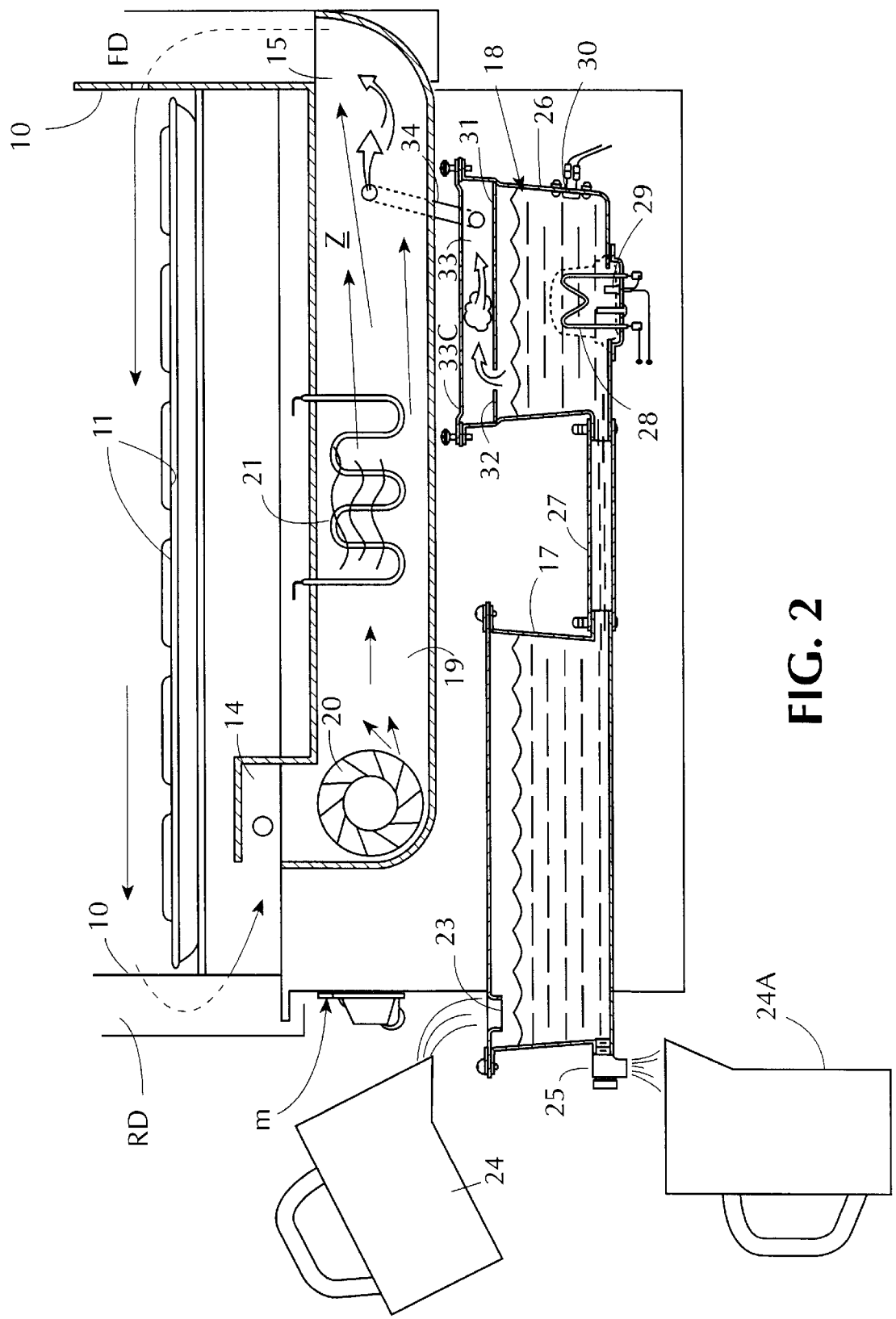
FIG. 2 is an enlarged view of the module and the lower portion of the chamber.

Referring now to FIGS. 1 and 2, there is shown an assembly for converting a multi-level baker's rack 10 into a chamber for proofing shaped yeast dough pieces contained in pans 11 loading the rack. The assembly is composed of a soft hood 12 formed of synthetic plastic sheet material and a module M in accordance with the invention for generating hot, humid air to be recirculated throughout the proofing chamber defined by the hood.

Rack 10 includes a frame formed by vertical and horizontal metal rods welded or riveted together to form a parallelpiped structure having caster 13 attached to the lower ends of the vertical rods so that the rack may be wheeled to any desired site.

Bridging the vertical rods of the frame which form the parallel sides of the frame is a vertical array of equi-spaced metal angle strips forming multi-level slides for receiving the pans 11 carrying the pieces of yeast dough to be proofed. In practice, rack 10 may be a standard baker's rack or a standard rack modified to better accept the soft hood.

Received in the base section of rack 10 is a module M in accordance with the invention which generates the hot, humid air that is recirculated throughout the proofing chamber. Module M includes an air intake 14 which is coupled to a return duct RD in the proofing chamber created by the space between rack 10 and the front end wall of hood 12. Also include in module M is an exhaust vent 15 from which hot, humid air is discharged into a feed duct FD created by the space between the rear end of hood 12 and rack 10. A more detailed description of the rack and hood and their relationship to a module is set forth in our above-identified copending application.

It will be seen in FIG. 1 that all levels of baker's rack 10 are occupied by pans 11 carrying shaped pieces of yeast dough to be proofed, and that below the stack of pans at the base of the rack is module M which emits from its exhaust vent 15 a stream of hot, humid air which is blown into feed duct FD.

Within module M which fits into the base of rack 10 a blower 20 which blows air drawn from air intake 14 through an electric heater element 21, the resultant hot air passing through a mixing zone Z before being discharged from exhaust vent 15. Injected into this mixing zone is steam produced by a steam generator, hence the hot air is rendered humid.

Blower 20 within the module therefore creates a negative pressure at its intake 14 which communicates with return duct RD and a positive pressure at exhaust vent 15 which communicates with feed duct FD of the proofing chamber.

As shown by the arrows in FIG. 1 a stream of hot, humid air discharged under positive pressure into feed duct FD from the exhaust vent 15 of the module passes from the feed duct across the dough pieces in pans 11 at every level of rack 10 toward return duct RD. The volume of hot, humid air is substantively the same at every level of the rack. The flow into return duct RD which is under negative pressure causes the stream of hot, humid air, after having subjected the dough pieces to a proofing environment, to be sucked back into the module through air intake 14 to produce a stream that is continuously recirculated in the proofing chamber.

Thus module M in combination with multilevel rack 10 and soft hood 12 covering the rack acts to develop within the proofing chamber a circulating flow loop in which hot, humid air continuously flows concurrently through all levels of the rack to uniformly proof the dough pieces supported on each of these levels. Hence all pieces are proofed to the same degree, no piece being overproofed or underproofed.

The Module

Figure 3:
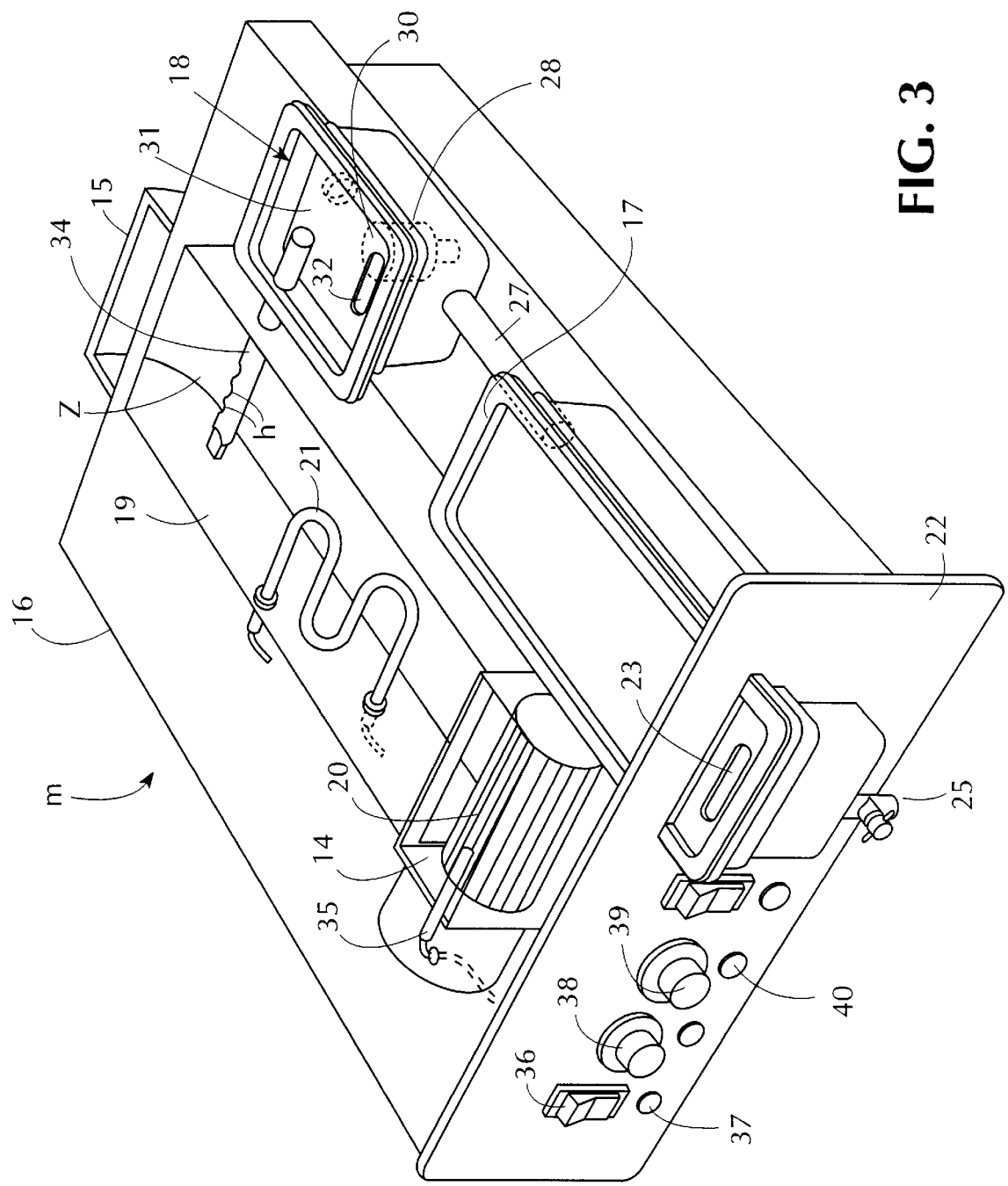
FIG. 3 is a perspective view of the actual module.

In an actual embodiment of a module in accordance with the invention as illustrated in perspective in FIG. 3, it will be seen that one longitudinal section of the rectangular casing 16 which houses the module is occupied by a water reservoir 17 and an adjacent steam generator 18. Occupying a parallel longitudinal section of casing 16 is an air duct 19 within which is motor driven blower 20 and an electric air heater element 21. The air intake 14 at one end of duct 19 leads air into blower 20 and the blown air which passes through heater element 21 and a mixing zone Z is exhausted from the duct through exhaust vent 15.

In order to reveal all of the components which make up the module, in the schematic showing in FIGS. 1 and 2, the air duct 19 and the components therein are placed above water reservoir 17 and steam generator 18 which is not the actual arrangement which is illustrated in FIG. 3.

Water reservoir 17 is in the form of a rectangular tray molded of transparent synthetic plastic material, such as an acrylic plastic. The front end of the reservoir projects out of an opening in the front panel 22 of the module. The reservoir is sealed by a top cover having at its front end an inlet 23 into which can be poured water to replenish the supply. Thus FIG. 2 shows a pitcher 24 feeding water into reservoir 17 through inlet 23. The level of water in reservoir 17 is visible through its transparent front end; hence one can tell when the water level is low and requires replenishment. And there is no need to open the proofing chamber in order to add water to the reservoir.

The projecting front end of reservoir 17 is provided with a drain valve 25 so that by opening this valve one can drain into a pitcher 24A all of the water contained in reservoir 17 and in steam generator 18.

Steam generator 18 includes a water pan 26 coupled by a feed pipe 27 at its base to the base of reservoir 17. Hence the level of water in pan 26 is the same as that in reservoir 17, the level being progressively reduced as water is boiled off. Reservoir 17 has a much larger water capacity than pan 26, and while the water in pan 26 is raised to an elevated temperature, because the pan is coupled to the reservoir by feed pipe 27 having a relatively small diameter, the water in reservoir 17 remains cool and there is little loss of heat from the steam generator.

Anchored at the base of water pan 26 is an electric water heater element 28 provided with a temperature sensor 29. Mounted on a side wall of pan 26 is a pre-heat thermostat 30. In practice, heater element 28 may be a 700 watt electric heater which is capable of quickly bringing the water in the pan to its boiling point.

Pan 26 is covered by a baffle plate 31 having an opening 32 therein which vents steam generated in the pan into a small steam chamber 33 above the pan provided with a top cover 33C. But because the steam in chamber 33 is exhausted into air duct 19, there is no pressure build-up in the chamber.

Air drawn into air intake 14 by blower 20 is blown, as shown by the arrows in FIG. 2, through electric air heater element 21 to produce a hot air stream that flows through mixing zone Z toward exhaust vent 15 at the outlet end of air duct 19. Air heater element 21 is preferably in the form of an undulating resistance element which emits infrared energy over an extended area in the direction of air flow.

Steam from steam chamber 33 in steam generator 18 is fed into mixing zone Z in the air duct by a steam tube 34. As best seen in FIG. 3, steam tube 34 which bridges the side walls of duct 19 is provided with a row of holes h, each of which injects steam in the direction of air flow in zone Z where the injected steam intermingles with the hot air stream. Thus the stream of hot, humid air emerging from exhaust vent 15 and fed into feed duct FD of the proofing chamber has a high humidity level. The holes h in steam tube 34 are sufficiently large as to cause all of the steam carried by this tube to exit into mixing zone Z. Hence there is no pressure build-up in steam chamber 33 or elsewhere in the module.

Because the hot air stream is rendered humid just after it flows past air heater element 21, the air is then at its highest temperature and is capable therefore of accepting the maximum volume of moisture. Relative humidity is the ratio in percent of the moisture actually in the air to the moisture it would hold if it were saturated at the same temperature and pressure. A module in accordance with the invention is capable of providing a high percentage of relative humidity, the percentage being adjustable to satisfy existing proofing requirements.

Heater element 21 heats up all components within air duct 19, hence no condensation is formed therein. The temperature of the air intake above blower 20 is sensed by a thermostatic sensor 35.

Figure 4:
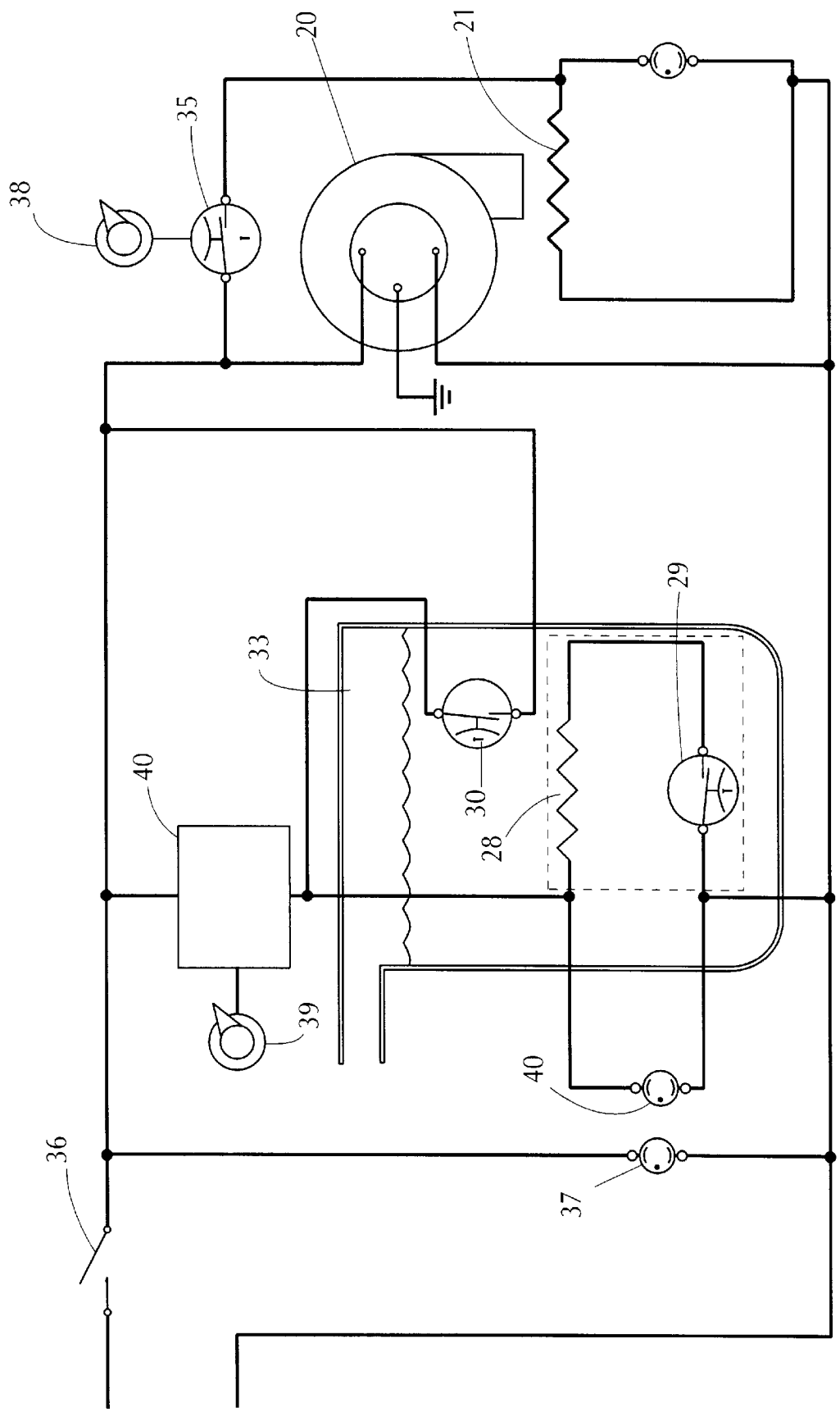
FIG. 4 is a schematic diagram of the electrical circuit of the module.

On front panel 22 of the module is a power switch 36 and a neon light 37 to indicate when the switch is turned on to apply, as shown in FIG. 4, 117 vAC power to the blower 20 as well as to the air heater element 21 and water heater element 28 of the module.

Power applied to air heater element 21 is adjustable by means of an air-temperature control knob 38 associated with air thermostat sensor 35. Humidity control is effected by a control knob 39 associated with a variable resistor or triac 40 which varies the power applied to water heater element 28 of the steam generator. A neon light 41 indicates when the water heater is turned on.

When the module is first turned on full power is applied to water heater element 28 to hasten the production of steam. But when the water in pan 26 of the steam generator reaches a temperature of 190° F., then pre-heat thermostat 30 which senses the water temperature is activated and the amount of power then applied to heater element 28 is determined by humidity control knob 39 and triac 40. In practice, the circuit of the module is such as to switch on air blower 20 only when steam generator 18 begins to produce steam.

Operation

When air heater element 21 and water heater element 28 of module 19 are both turned on, water contained in pan 26 of the steam generator supplied thereto by reservoir 17 is boiled to produce steam that is collected in steam chamber 33. Steam from chamber 33 is injected by tube 34 into mixing zone Z in air duct 19 in the direction of air flow whereby the steam ejected from the row of holes h intermingles with the hot air stream to produce a hot, humid air stream which is discharged from exhaust vent 15. This hot, humid air stream is suitable for proofing yeast dough or for any other application requiring an atmosphere of hot, humid air whose temperature and relative humidity are controllable to satisfy operating criteria.

The level of water in reservoir 17 is visible so that when the level is low an operator can then add water to the reservoir without however having to open the door to the proofing chamber to obtain access to the reservoir, for inlet 23 to the reservoir is outside the proofing chamber. Should it have been necessary to open the door to the proofing chamber, ambient air would then intermingle with the hot, humid environment of the chamber interior and disturb this environment.

When it becomes necessary to clean and delime the water system of module M, all of the water in the reservoir and in the pan of the steam generator can be drained from the module simply by opening drain valve 25 which is outside of the proofing chamber and therefore does not require that the proofing chamber be opened to obtain access to the module.

While there has been shown and described a preferred embodiment of a module for producing hot, humid air, it will be appreciated that many changes and modifications may be made therein without, however, departing from the essential spirit thereof. Thus while the module has been shown in combination with a "soft" proofing chamber it is useable with a standard proofing cabinet whose rear end has an air feed duct into which is fed hot, moist air from the exhaust vent of the module. The front end of the cabinet having an air return duct which feeds the hot, moist air back into the air intake of the module for recirculation.

I claim:

1. A module adapted to generate a stream of hot, humid air comprising:

A. an air duct having an air intake at an inlet end thereof, an exhaust vent at an outlet end thereof and a mixing zone adjacent said vent;

B. a motor-driven blower disposed in the duct adjacent said intake to blow a stream of air toward the exhaust vent;

C. an electric air heater element disposed in the duct to heat the air stream; and D. means to inject steam into said mixing zone in the duct to intermingle with the hot air stream whereby discharged from the exhaust vent is a stream of hot, humid air, said means to inject steam including a steam generator provided with a water Pan having an electric water heater element therein to boil the water in the pan to produce said steam, and a refillable water reservoir adjacent said steam generator and coupled to said pan whereby the water level in the pan is the same as that in the reservoir.

2. A module as set forth in claim 1, in which the air heater element is disposed in the duct at a position intermediate the blower and the mixing zone.

3. A module as set forth in claim 1, in which said steam generator includes a steam chamber placed above the pan which is coupled by a stream tube to said duct to inject steam into the mixing zone in the direction of air flow of the air stream.

4. A module as set forth in claim 3, in which the steam tube is provided with a row of holes from each of which steam is injected into the hot air stream.

5. A module as set forth in claim 1, in which said reservoir is formed of transparent plastic material whose front end projecting through a front panel of the module whereby the level of water in the reservoir is visible.

6. A module as set forth in claim 5, in which said reservoir is provided with a cover having a inlet at the front end projecting through the panel whereby water may be added to the reservoir through said inlet.

7. A module as set forth in claim 6, further including a drain valve coupled to the projecting front end of the tray to drain water from the reservoir and the pan.

8. A module as set forth in claim 1, in which the electric air heat element is an undulating resistance element producing heat over a broad area in the direction of flow of the air stream.

9. A module as set forth in claim 1, operating in conjunction with a proofing chamber for proofing yeast dough pieces loaded in a rack, said proofing chamber having a feed duct couple to said exhaust and a return duct coupled to said air intake whereby the stream of hot humid air is distributed by said feed duct to flow across the dough pieces in the chamber into the return duct, from which the stream is returned to the air intake for recirculation in the chamber.

10. A module for generating a stream of hot, humid air comprising:

A. a rectangular casing having adjacent sections therein;

B. an air duct disposed in one of the sections, said air duct having an air intake at one end, an exhaust vent at the other end and a mixing zone adjacent the exhaust duct;

C. a blower disposed in the duct adjacent said intake to blow a stream of air toward the exhaust duct;

D. an electric heater element disposed in the air duct at a position intermediate the blower and said mixing zone adjacent the exhaust vent to heat the air stream flowing through the mixing zone; and E. a water reservoir and a steam generator adjacent thereto disposed in the other section of the casing, said steam generator having a water pan fed by said reservoir and an electric heater element to boil the water in the pan to produce steam which is injected into the mixing zone of the duct in said one section of the casing to intermingle with the hot air stream whereby discharged from the exhaust vent is a stream of hot, humid air.

11. A module as set forth in claim 10, in which water boiled in the pan produces steam which is vented into a steam chamber above the pan, the steam chamber being coupled by a steam tube to the mixing zone in the duct.

12. A module as set forth in claim 10, in which the blower is rendered operative only when the steam generator produces steam.

13. A module adapted to generator a stream of hot, humid air comprising:

A. an air duct having an air intake at one end at one end thereof and an exhaust vent at the other end;

B. a blower disposed in the duct to blow a stream of air from the intake toward the vent;

C. an electric air heater in the duct to heat the stream of air;

D. a refillable water reservoir, and a steam generator adjacent to the reservoir, said steam generator including a water pan supplied with water by the reservoir whereby the water level in the pan in the same as that in the reservoir, and an electric water heater in the pan to boil the water therein to produce steam; and E. means to inject steam produced in the steam generator into said duct to render the heated air steam therein humid.

* * * * *